United States Patent
Compton et al.

(10) Patent No.: US 9,921,375 B2
(45) Date of Patent: Mar. 20, 2018

(54) FERRULE-BASED FIBER OPTIC CONNECTORS WITH FERRULE RETRACTION BALANCING USING AXIAL GAP GEOMETRY

(71) Applicant: Corning Optical Communications LLC, Hickory, NC (US)

(72) Inventors: Brandon Duvall Compton, Granite Falls, NC (US); Micah Colen Isenhour, Lincolnton, NC (US); Thomas Theuerkorn, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/455,522

(22) Filed: Mar. 10, 2017

(65) Prior Publication Data
US 2017/0261698 A1    Sep. 14, 2017

Related U.S. Application Data

(60) Provisional application No. 62/306,377, filed on Mar. 10, 2016.

(51) Int. Cl.
G02B 6/38    (2006.01)

(52) U.S. Cl.
CPC ......... *G02B 6/3874* (2013.01); *G02B 6/3821* (2013.01); *G02B 6/3869* (2013.01); *G02B 6/3877* (2013.01); *G02B 6/3887* (2013.01)

(58) Field of Classification Search
CPC .................. G02B 6/3874; G02B 6/3877
See application file for complete search history.

(56) References Cited

U.S. PATENT DOCUMENTS

| | | | |
|---|---|---|---|
| 4,684,205 A | 8/1987 | Margolin et al. | |
| 5,129,023 A * | 7/1992 | Anderson | G02B 6/3831 385/60 |

(Continued)

FOREIGN PATENT DOCUMENTS

| | | |
|---|---|---|
| GB | 2468442 A | 9/2010 |
| JP | 2013218103 A | 10/2013 |

(Continued)

*Primary Examiner* — Sung Pak
(74) *Attorney, Agent, or Firm* — Michael E. Carroll, Jr.

(57) ABSTRACT

Ferrule-based fiber optic connectors having a ferrule-retraction balancing characteristic are disclosed. An example fiber optic connector includes a connector assembly and a connector sleeve assembly. The connector assembly includes a ferrule, a resilient member, and a connector body having a latch point and a ferrule stop. The connector sleeve assembly includes a ferrule sleeve and a sleeve housing having a latch, a first stop, and a second stop. The connector assembly is disposed in the passageway of the sleeve housing, and the ferrule of the connector assembly is disposed in the ferrule sleeve in a direction extending from the first stop. When the fiber optic connector is in an unmated state, a gap $G_{L1}$ is present between the at least one latch and the at least one latch point, and a gap $G_{S1}$ is present between the first stop and a first end of the ferrule sleeve.

35 Claims, 7 Drawing Sheets

(56) References Cited

U.S. PATENT DOCUMENTS

| | | | |
|---|---|---|---|
| 5,179,608 A | 1/1993 | Ziebol et al. | |
| 5,261,019 A | 11/1993 | Beard et al. | |
| 5,317,663 A | 5/1994 | Beard et al. | |
| 5,542,015 A * | 7/1996 | Hultermans | G02B 6/3893 385/139 |
| 5,671,310 A | 9/1997 | Lin et al. | |
| 5,781,680 A * | 7/1998 | Womack | G02B 6/3825 385/53 |
| 5,862,282 A | 1/1999 | Matsuura et al. | |
| 6,048,103 A * | 4/2000 | Furukata | G02B 6/3825 385/73 |
| 6,126,325 A * | 10/2000 | Yamane | G02B 6/421 385/70 |
| 6,152,608 A * | 11/2000 | Ghara | G02B 6/3893 385/60 |
| 6,579,014 B2 | 6/2003 | Melton et al. | |
| 6,712,523 B2 | 3/2004 | Kimmel | |
| 7,090,406 B2 | 8/2006 | Melton et al. | |
| 7,113,679 B2 | 9/2006 | Melton et al. | |
| 8,070,367 B2 | 12/2011 | Winberg et al. | |
| 8,480,310 B2 | 7/2013 | Kewitsch | |
| 8,870,469 B2 | 10/2014 | Kachmar | |
| 9,069,140 B2 * | 6/2015 | Park | G02B 6/3846 |
| 2002/0181188 A1 | 12/2002 | Ozeki et al. | |
| 2003/0063866 A1 | 4/2003 | Melton et al. | |
| 2009/0185779 A1 | 7/2009 | Gurreri et al. | |
| 2011/0085764 A1 | 4/2011 | Greub et al. | |
| 2013/0114931 A1 | 5/2013 | Mitchell et al. | |
| 2014/0205241 A1 | 7/2014 | Nielson | |
| 2016/0324402 A1 * | 11/2016 | Yajima | G02B 6/3874 |
| 2017/0254962 A1 * | 9/2017 | Mueller-Schlomka | G02B 6/3825 |
| 2017/0261696 A1 * | 9/2017 | Compton | G02B 6/3869 |
| 2017/0261699 A1 * | 9/2017 | Compton | G02B 6/3874 |

FOREIGN PATENT DOCUMENTS

| | | |
|---|---|---|
| WO | 2013173273 A1 | 11/2013 |
| WO | 2014133837 A1 | 9/2014 |

\* cited by examiner

FERRULE-BASED FIBER OPTIC CONNECTORS WITH FERRULE RETRACTION BALANCING USING AXIAL GAP GEOMETRY

CROSS-REFERENCE TO RELATED APPLICATIONS

This application claims the benefit of priority under 35 U.S.C. § 119 to U.S. Provisional Application No. 62/306,377, filed on Mar. 10, 2016, the benefit of priority under 35 U.S.C. § 120 of U.S. application Ser. No. 15/446,493 filed on Mar. 1, 2017, and the benefit of priority under 35 U.S.C. § 365 of International Patent Application Serial No. PCT/US17/20132 filed on Mar. 1, 2017 designating the United States of America, the content of which are relied upon and incorporated herein by reference.

BACKGROUND

The disclosure is directed to fiber optic connectors having a translatable ferrule with one or more optical fibers along with cable assemblies using the fiber optic connectors. More specifically, the disclosure is directed to ferrule-based fiber optic connectors having a balanced ferrule retraction characteristic for preserving optical performance.

Optical fiber is increasingly being used for a variety of applications, including but not limited to broadband voice, video, and data transmission. As bandwidth demands increase optical fiber is migrating toward subscribers in outdoor communication networks such as in fiber to the premises applications such as FTTx and the like. To address this need for making optical connections in communication networks for the outside the plant environment hardened fiber optic connectors were developed. One of the most commercially successful hardened fiber optic connectors is the OptiTap® male plug connector sold by Corning Cable Systems, LLC of Hickory, N.C., such as disclosed in U.S. Pat. Nos. 7,090,406 and 7,113,679 (the '406 and '679 patents) and incorporated herein by reference. The Optitap® connector is a hardened male plug connector for terminating a cable that is configured for optical connection using a receptacle. As used herein, the term "hardened" describes a connector or receptacle port intended for making an environmentally sealed optical connection suitable for outdoor use, and the term "non-hardened" describes a connector or receptacle port that is not intended for making an environmentally sealed optical connection such as a SC connector.

Figures 1A, 1B:
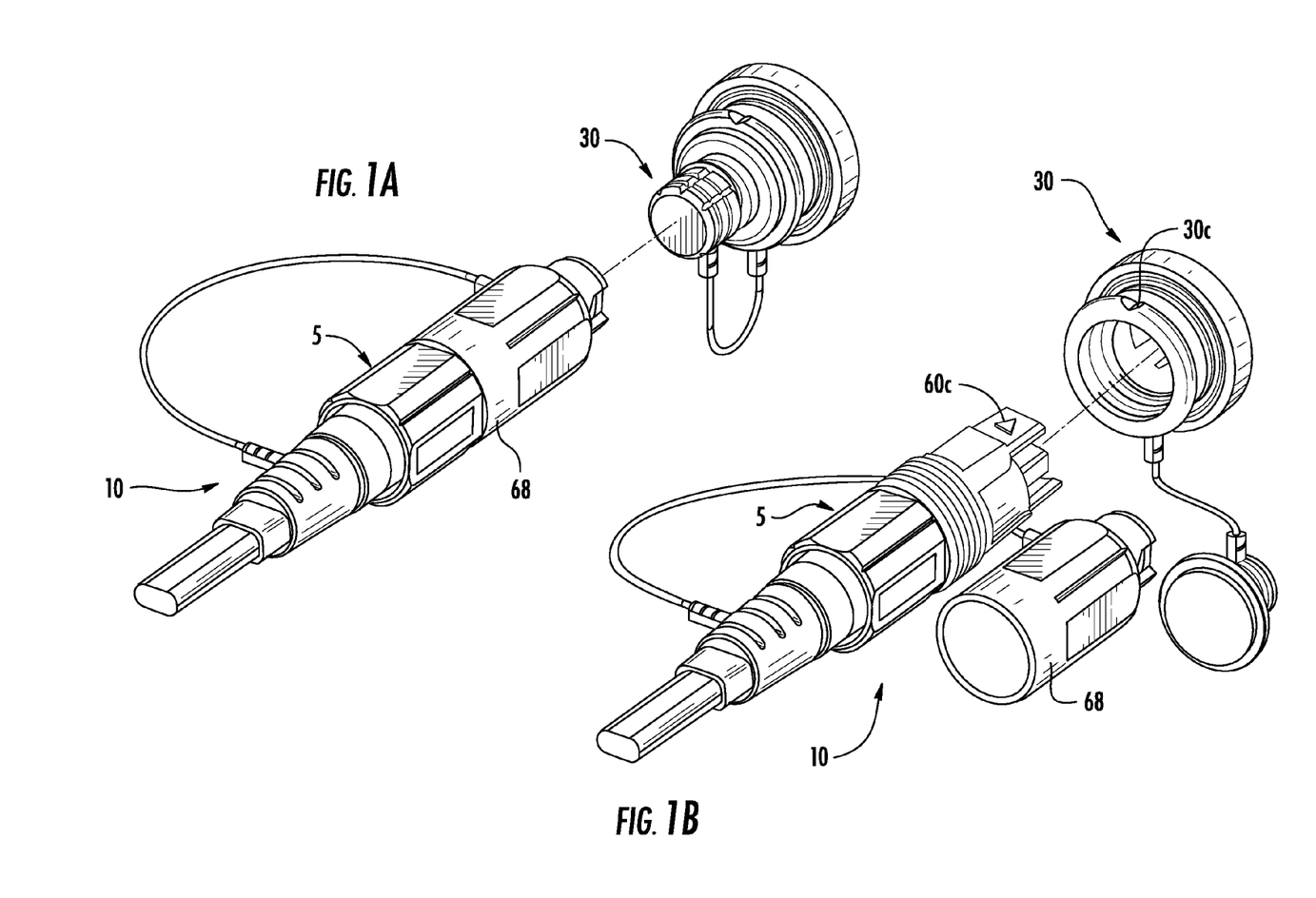
FIGS. 1A-1C show portions of a conventional preconnectorized fiber drop cable having a hardened connector such as an OptiTap® male plug connector being inserted into and connected with a conventional receptacle for alignment and mating the hardened connector with a non-hardened connector.
Figure 1C:
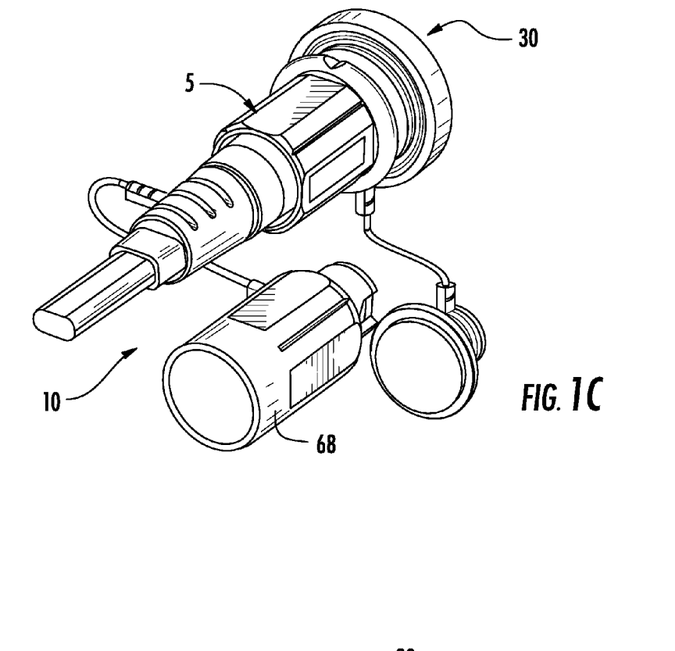

FIGS. 1A-1C are prior art depictions showing various stages of mating of a preconnectorized cable 10 having a plug connector 5 such as an OptiTap® connector with a receptacle 30. Receptacle 30 mates plug connector 5 with a standard SC connector (i.e., a non-hardened connector) at a second end (not visible in these views) using an adapter sleeve for aligning ferrules when mating plug connector 5 with the a non-hardened connector. Protection of the non-hardened connector side of the receptacle is typically accomplished by mounting the receptacle 30 through a wall of an enclosure or the like so that the non-hardened end of the receptacle is disposed inside the enclosure for environmental protection of the non-hardened connector. As shown by FIGS. 1A-1C, the other end of the receptacle 30 is accessible for receiving the plug connector 5 at the wall of the enclosure. Other applications may mount the receptacle 30 inside an enclosure on a bracket or the like.

Figure 2:
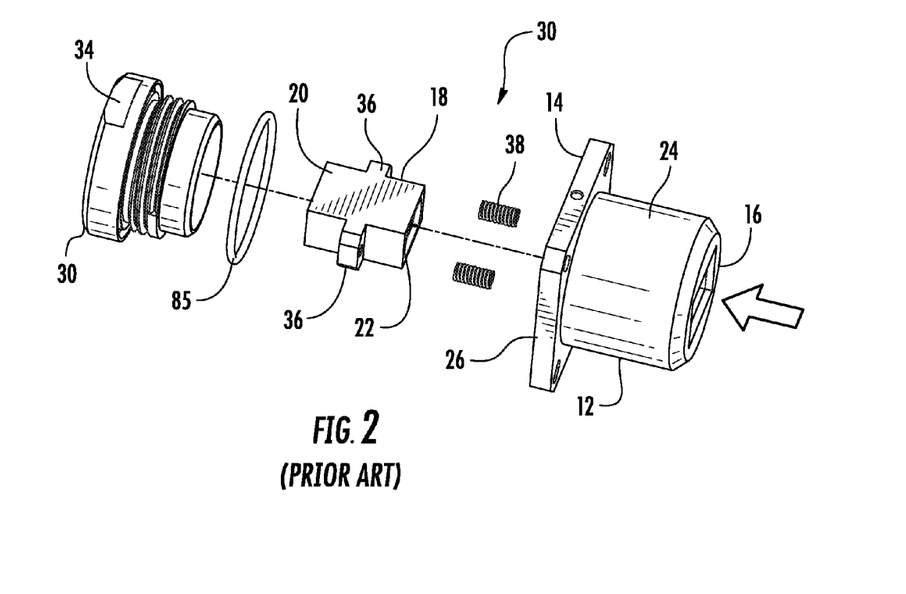
FIG. 2 is a partially exploded view of a conventional receptacle such as depicted in FIGS. 1A-1C for mating a hardened connector with a non-hardened connector.

Receptacle 30 allows an optical connection between the hardened connector such as the OptiTap® male plug connector with a non-hardened connector such as the SC connector at nodes in the optical network that typically transition from an outdoor space to an indoor space. FIG. 2 depicts an exploded view of receptacle 30, which is described in further detail in U.S. Pat. No. 6,579,014. As depicted, receptacle 30 includes a receptacle housing 12 and an adapter sleeve 18 disposed therein. The receptacle 30 receives a non-hardened connector at a second end 16 as represented by the arrow pointing to the left. Adapter sleeve 18 is biased toward a first end 14 of the receptacle 30 that receives the connector 5 using springs 38. This biasing of the adapter sleeve 18 toward the first end 14 that receives the plug connector 5 is used for maintaining physical ferrule-to-ferrule contact between the plug connector and the SC connector to increase the "float" between the mating ferrules. When mated, the ferrule of the plug connector 5 is not latched to the adapter sleeve, and springs 38 of receptacle 30 are used for increasing the "float" between the mating ferrules of the plug connector and the non-hardened connector.

Network operators often desire to optically connect a first hardened connector to another hardened connector in a space that requires a rugged connection point, which receptacle 30 is incapable of accomplishing. Consequently, there exists an unresolved need for fiber optic connectors that can mate directly with to another hardened connector in a quick and reliable manner while providing a ruggedized solution that preserves optical performance.

SUMMARY

The disclosure is directed to ferrule-based fiber optic connectors having a ferrule displacement balancing construction for inhibiting the loading-up of ferrule displacement within the fiber optic connector, which can cause undue optical attenuation when mated with a complimentary connector. As discussed herein, the balancing of the ferrule retraction in ferrule-based fiber optic connectors depend on several factors related to the frictional forces between the ferrule and the ferrule sleeve, and the concepts disclosed use an axial gap geometry and reduced friction and/or normal force of the ferrule of a complementary connector on a ferrule sleeve that prevents the ferrule sleeve from making a forced stop upon mating, thereby allowing balanced displacement of both connected ferrules within the fiber optic connector. The concepts disclosed are useful for hardened fiber optic connectors that mate directly to hardened plug connectors. As an example, the concepts are useful with a female hardened connector that mates with a hardened plug connector, but other applications for the concepts disclosed are possible and advantageous as well. Thus, the concepts also allow a compact footprint for fiber optic connectors since the spatial arrangement is more compact than the prior art.

In this regard, in one embodiment, a fiber optic connector includes a connector assembly and a connector sleeve assembly. The connector assembly includes a ferrule, a resilient member for biasing the ferrule forward, and a connector body having at least one latch point and at least one ferrule stop, wherein the ferrule and the resilient member are disposed within the connector body. The connector sleeve assembly includes a ferrule sleeve and a sleeve housing having at least one latch, a first stop at a first end, a second stop at a second end, and a passageway between the first end and the second end. The connector assembly is at least partially disposed in the passageway of the sleeve housing, and the ferrule of the connector assembly is at least partially disposed in the ferrule sleeve in a direction extending from the first stop. When the fiber optic connector is in an unmated state, a gap $G_{L1}$ is present between the at least one latch and the at least one latch point, and a gap $G_{S1}$ is present between the first stop of the sleeve housing and a first end of the ferrule sleeve.

In another embodiment, a fiber optic connector assembly includes a first connector assembly, a second connector assembly, and a connector sleeve assembly. The first connector assembly includes a first ferrule, a first resilient member for biasing the first ferrule forward, and a first connector body having at least one first latch point and at least one ferrule stop, wherein the first ferrule and the first resilient member are disposed within the first connector body. The second connector assembly includes a second ferrule and a second resilient member for biasing the second ferrule forward, wherein a diameter of the first ferrule is greater than a diameter of the second ferrule. The connector sleeve assembly includes a sleeve housing having at least one latch, a first stop at a first end, a second stop at a second end, and a passageway between the first end and the second end, and a ferrule sleeve, wherein the first connector assembly is at least partially disposed in the passageway of the sleeve housing, and the first ferrule of the first connector assembly is at least partially disposed in the ferrule sleeve in a direction extending from the first end. When the fiber optic connector assembly is in an unmated state, a gap $G_{L1}$ is present between the at least one latch and the at least one first latch point, and a gap $G_{S1}$ is present between the first stop of the sleeve housing and a first end of the ferrule sleeve. When the fiber optic connector assembly is in a mated state such that the first connector assembly is mated to the second connector assembly within the sleeve housing, the second ferrule of the second connector assembly is disposed within the ferrule sleeve, the first end of the ferrule sleeve does not contact the first stop of the sleeve housing such that the gap $G_{S1}$ when the fiber optic connector assembly is in the mated state is less than the gap $G_{S1}$ when the fiber optic connector assembly is in the unmated state, and the second end of the ferrule sleeve does not contact the second stop of the sleeve housing.

In yet another embodiment, a method of assembling a fiber optic connector assembly includes coupling a first connector assembly to a connector sleeve assembly. The first connector assembly includes a ferrule, a resilient member for biasing the ferrule forward, and a connector body having at least one latch point, wherein the ferrule and the resilient member are disposed within the connector body. The connector sleeve assembly includes a sleeve housing having at least one latch, a first stop at a first end, a second stop at a second end, and a passageway between the first end and the second end, and a ferrule sleeve. The first connector assembly is at least partially disposed in the passageway of the sleeve housing, and the ferrule of the first connector assembly is at least partially disposed in the ferrule sleeve in a direction extending from the first stop. The first connector assembly is coupled to the connector sleeve assembly such that a gap $G_{L1}$ is present between the at least one latch and the at least one latch point, and a gap $G_{S1}$ is present between the first stop of the sleeve housing and a first end of the ferrule sleeve.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Reference will now be made in detail to the embodiments of the disclosure, examples of which are illustrated in the accompanying drawings. Whenever possible, like reference numbers will be used to refer to like components or parts.

The fiber optic connectors and cable assemblies described herein are suitable for making optical and/or optical-electrical connections (if electrical connections are included in the connectors) to a conventional male hardened plug connector Although the concepts disclosed herein are explained with respect to a female hardened fiber optic connector used for optical connection with the male hardened plug connector an OptiTap connector, the concepts disclosed may be used with other fiber optic connectors hardened or not and are not limited to this particular optical connection.

The concepts of the disclosure advantageously allow robust and reliable optical connections for ferrule-based fiber optic connectors by balancing the ferrule retraction and inhibiting the loading-up of the ferrule displacement in the fiber optic connector that can occur during assembly and/or during mating, thereby avoiding undue optical attenuation. As explained below, the balancing of ferrule retraction in ferrule-based fiber optic connectors depend on several factors, but the concepts disclosed direct the frictional forces to the ferrule-to-ferrule forces in the alignment sleeve to inhibit the loading-up of ferrule displacement in the fiber optic connector.

Figure 3:
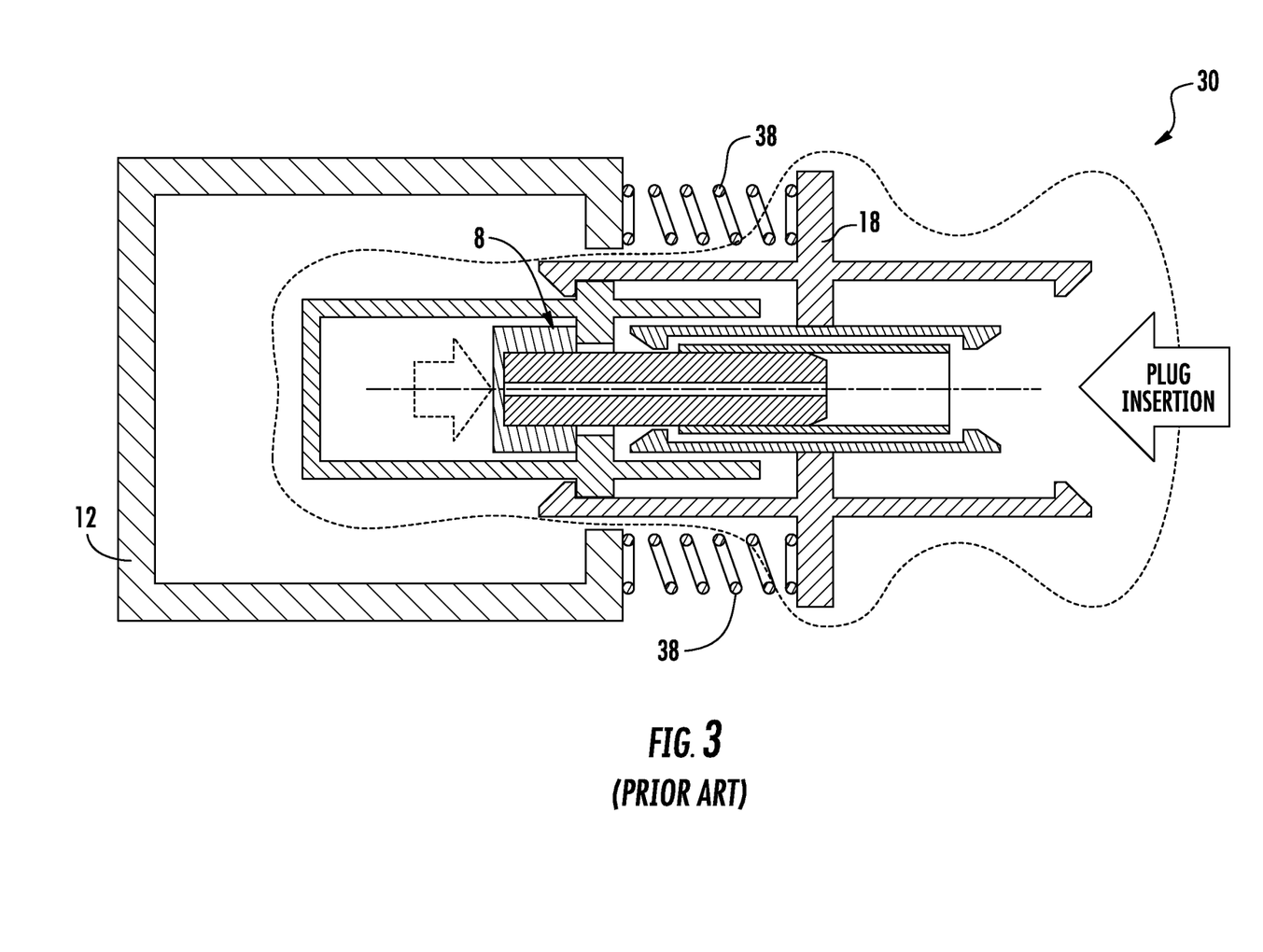
FIG. 3 is a schematic force-loading diagram for the conventional receptacle of FIG. 2 with its floating biasing spring construction according to the prior art.

For explanatory purposes, the operation of the prior art receptacle 30 of FIG. 2 is explained using a schematic force-loading diagram of FIG. 3. Thereafter, reference will be made in detail to the concepts disclosed herein using the schematic force-loading diagram of FIG. 4, along with example embodiments of fiber optic connector 100 which are illustrated in the accompanying drawings. As depicted, the schematic force-loading diagrams are models showing different constructions for the conventional receptacle 30 (FIG. 3) and fiber optic connectors 100 (FIG. 4) according to the present application.

FIG. 3 is a schematic force-loading diagram for the conventional receptacle 30 of FIG. 2 depicting its "floating biasing spring" construction for mating a hardened connector with a non-hardened connector. In the "floating biasing spring" construction of receptacle 30 the non-hardened connector 8 floats as a unit with adapter sleeve 18. FIG. 3 depicts a dashed line drawn around the adapter sleeve 18 and the non-hardened connector 8 and the dashed line represents that the adapter sleeve 18 and non-hardened connector 8 "floating as a unit" within a receptacle housing 12 according to conventional receptacle 30 of the prior art. As shown, springs 38 bias the floating unit toward a first end 14 of the receptacle 30 that receives the plug connector 5. The arrow of FIG. 3 pointing to the left represents the insertion direction of the hardened connector such as plug connector 5 being inserted into receptacle 30.

On the other hand, the fiber optic connectors and fiber optic cable assemblies of the present application have a different construction and operation from receptacle 30 with the "floating biasing spring" construction. Unlike receptacle 30, the fiber optic connectors disclosed herein do not have a floating unit (i.e., an adapter sleeve and non-hardened connector that "float" as a unit) that moves together relative to the housing of the connector.

Figure 4:
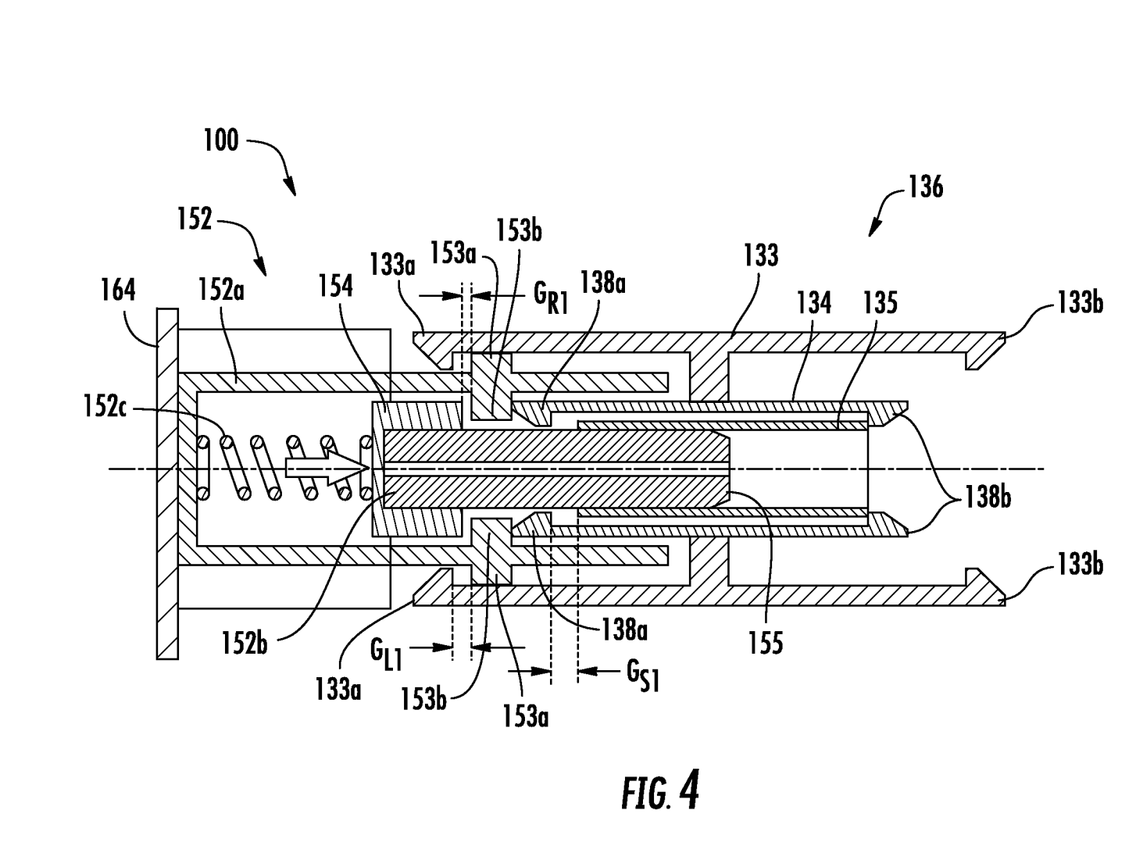
FIG. 4 is a schematic force-loading diagram for a fiber optic connector with an axial gap geometry for ferrule retraction balancing according to the concepts disclosed herein.

The concepts of the present application represented by FIG. 4 disclose fiber optic connectors comprising a ferrule retraction balancing construction. Unlike the prior art receptacle 30 shown in the schematic force-loading diagram of FIG. 2, the fiber optic connector 100 of FIG. 4 has a connector assembly 152 that is fixed (i.e., inhibited from freely traveling) to the fiber optic connector such as fixed to a connector housing 164 of fiber optic connector 100 and the connector sleeve assembly 136 floats relative to the connector housing 164. Having the connector assembly 152 "fixed" to the fiber optic connector means that the connector assembly is inhibited from traveling by a portion of the fiber optic connector such as an inner portion of the fiber optic connector like a retention body that may secure the connector assembly or the travel may be inhibited by an outer portion of the connector such as an outer housing depending on the construction of the connector. The construction of fiber optic connector 100 depicted in FIG. 4 has an operation that is very different than the construction of receptacle 30 of FIG. 2.

With the connector assembly 152 fixed to the fiber optic connector 100 as depicted in FIG. 4, it is possible for the "loading-up" of ferrule displacement to occur, which can cause undue levels of optical attenuation. The present application solves the issue of ferrule displacement by using an axial gap geometry and ferrule friction reduction for fiber optic connectors disclosed herein and is directed to balancing out the forces related to the ferrule sleeve friction during assembly and mating.

Fiber optic connectors disclosed herein include a connector assembly 152 comprising a ferrule 152b and a resilient member 152c. By way of example, and not limitation, suitable connector assemblies may include LC, SC along with other connector assemblies having a ferrule and ferrule sleeve arrangement as desired. Fiber optical connectors disclosed herein are advantageous for efficiently and economically streamlining the deployment and installation of fiber optic networks since they provide a robust and reliable operation. Moreover, different connector designs according to the concepts disclosed may have different force requirements for the balancing resilient member since the friction forces required for displacement of a ferrule within a ferrule sleeve may vary by the connector type. By way of explanation, and not limitation, the friction force for a SC connector may be greater than the friction forces for an LC connector since the SC connector has a ferrule with a larger surface area in contact with the respective ferrule sleeve.

The problem with conventional connectors is that, typically, one connector assembly having a ferrule is pre-inserted into the connector sleeve assembly creating a fiber optic connector. Later a mating connector is inserted into fiber optic connector 100 such as shown by the arrow in FIG. 4 to represent insertion of the plug connector to make an optical connection. Although both of the mating connector assemblies of fiber optic connector 100 and the mating plug connector represented by the arrow are similar, the behavior of the individual connector assemblies of the plug connector and the fiber optic connector 100 are not similar during mating. The ceramic based ferrules of fiber optic connectors are axially aligned for physical contact during mating using a ferrule sleeve 135 having a precision-fit with the ferrules that are inserted therein. However, this ferrule sleeve 135 is positioned within a sleeve housing 133 of the connector sleeve assembly 136 so that it is "loosely captive" within the housing 133. "Loosely captive" means that the ferrule sleeve 135 is held within the housing 133 such that it has no impediment to expanding as a ferrule enters, along with having space to accommodate variations in the initial mating angle of mating ferrules, and the ferrule sleeve 135 may also move axially. These movements of the ferrule sleeve are required to allow alignment and proper mating of the ferrule faces for inhibiting undue optical attenuation in the mating connectors.

There is a friction force between the ceramic ferrule and ferrule sleeve that must be overcome during assembly. Consider the ferrule of the first fiber optic connector being "prepositioned" within the ferrule sleeve so its endface is disposed into the length of the ferrule sleeve. The ferrule sleeve being "loosely captive" within the housing is "pushed" during this "prepositioning" to the farthest point within the housing away from the inserted ferrule (i.e., to the far end) where it awaits the complimentary mating ferrule. The ferrule sleeve will not move on its own from this position due to the static friction force between ferrule sleeve and ferrule of the connector assembly.

When the mating ferrule of the complimentary connector encounters the ferrule sleeve of the first fiber optic connector during mating, the mating ferrule causes the ferrule sleeve to "open" to receive the mating ferrule. Generally speaking, the ferrule sleeve typically has a lead-in feature such as a chamfer to ease this initial transition. Once "open" the mating ferrule may be inserted into the ferrule sleeve until it encounters the ferrule of the first fiber optic connector for physical contact during mating. However, it is likely that the mating ferrules/ferrule sleeve are displaced from a generally centered position, which can cause undue optical attenuation and/or other performance issues. For instance, the mating ferrule of the plug connector may be displaced by a distance than is greater than the design parameters of the plug connector being mated with the first fiber optic connector. In some cases, the ferrule sleeve and captive ferrule of the first fiber optic connector are translated back such that an end of the ferrule sleeve undesirably contacts a stop within the sleeve housing 133. In such an arrangement, the first connector assembly is retracted more than the mating connector assembly. Although the connector assemblies may still be mated, this uneven displacement of ferrules is undesirable and may cause elevated levels of optical attenuation, reduce reliability and/or cause other issues for the mated connectors.

The present application solves this problem of unbalanced displacement of ferrules during mating by providing fiber optic connectors with a ferrule retraction balancing construction.

As described in more detail below, FIG. 4 schematically depicts an example fiber optic connector 100 that utilizes a gap geometry to ensure that the ferrule sleeve 135 does not contact a connector sleeve assembly when a complimentary connector assembly is mated to the fiber optic connector 100. Particularly, a gap geometry within the fiber optic connector 100 is designed such that axial support of the ferrule sleeve 135 against a first or second stop of the connector sleeve assembly does not occur. Thus, the two ferrules and the ferrule sleeve float as one unit within the connector sleeve assembly, as describe in more detail below. This allows for balanced ferrule retraction for both mated fiber optic connectors. To enable this solution, the repositioning of the first ferrule 152b of the first connector assembly 152 acting as the receptacle fiber optic connector caused by the initial force of the insertion of a ferrule of a complementary fiber optic connector should be avoided.

Particularly, the example fiber optic connector 100 comprises a first connector assembly 152 (i.e., a first connector assembly acting as a receptacle connector assembly) and a connector sleeve assembly 136. The connector sleeve assembly 136 comprises a ferrule sleeve 135 within a sleeve housing 133 comprising at least one latch 133a and a sleeve holder portion 134. The ferrule sleeve 135 is disposed within the sleeve holder portion 134. The sleeve holder portion 135 of sleeve housing 133 has a first stop 138a for the ferrule sleeve 135 at a first end, and a second stop 138b for the ferrule sleeve 135 at a second end. A passageway is defined between the first end and the second end of the connector sleeve assembly 136.

Figure 7:
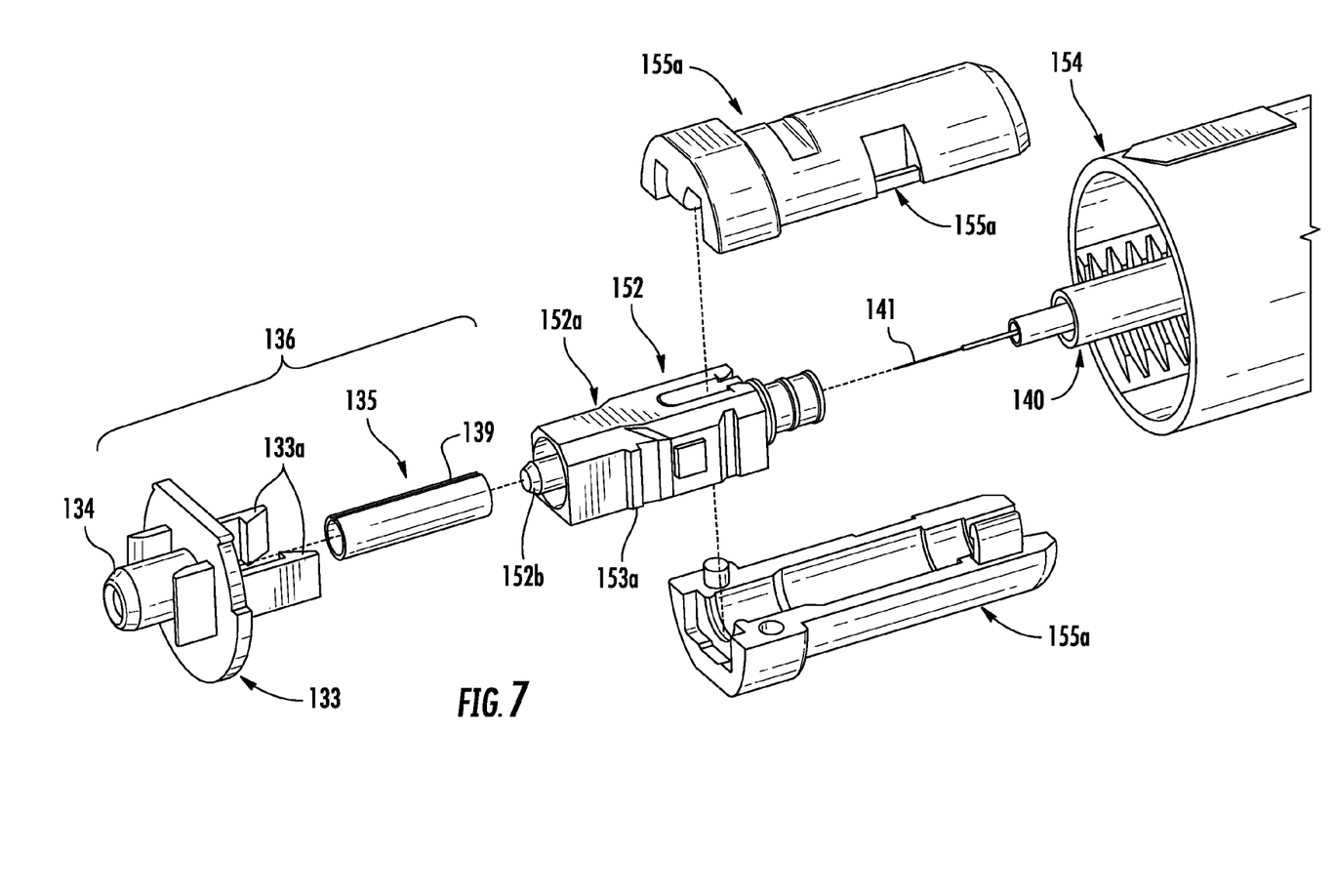
FIG. 7 is an exploded view of an explanatory fiber optic connector having a connector assembly, a connector sleeve assembly, and a female coupling housing according to the concepts disclosed herein.

Referring briefly to FIG. 7, the ferrule sleeve 135 may be a cylindrical split sleeve having a slit 139 down its length, thereby enabling the ferrule sleeve 135 to expand (i.e., increase of diameter) upon insertion of a ferrule or by some other force or mechanism.

The example first connector assembly 152 depicted in FIG. 4 comprises a first connector body 152a, a first ferrule holder 154, and a first ferrule 152b coupled to the first ferrule holder 154. The first connector assembly 152 further includes a first bias member 152c that biases the first ferrule holder 154 and the first ferrule 152b in a forward direction, as shown in FIG. 4. The first bias member 152c may be a spring, for example. The example first connector body 152a includes at least one first latch point 153a operable to engage the at least one first latch 133a of the sleeve housing 133. The example first connector body 152a further includes at least one first ferrule stop 153b extending into an interior of the first connector body 152a toward the first ferrule 152b. The at least one first ferrule stop 153b provides a stop for the first ferrule holder 154, thereby preventing too much forward movement of the first ferrule 152b into the connector sleeve assembly 136. In the example of FIG. 4, the at least one first latch point 153a and the at least one first ferrule stop 153b are aligned. However, embodiments are not limited thereto.

Unlike the prior art receptacle 30 shown in the schematic force-loading diagram of FIG. 2, the fiber optic connector 100 of FIG. 4 has a first connector assembly 152 that is fixed (i.e., inhibited from freely traveling) to the fiber optic connector 100, such as fixed to a connector housing 164 of fiber optic connector 100, and the connector sleeve assembly 136 floats relative to the connector housing 164. The construction of fiber optic connector 100 depicted in FIG. 4 has an operation that is very different than the construction of receptacle 30 of FIG. 2.

Still referring to FIG. 4, the first connector assembly 152 is inserted into the connector sleeve assembly 136 such that the first ferrule 152b enters the passageway of the connector sleeve assembly 136 and into the ferrule sleeve 135 within the sleeve support portion 134. The first ferrule 152b has a precision fit within ferrule sleeve 135 for precisely aligning of the optical cores of the optical fibers secured in the respective mating ferrules. As a result of this precision fit, the first ferrule 52b contacts the ferrule sleeve 135 during assembly. The frictional force of the surface of the first ferrule 152b on the inner surface of the ferrule sleeve 135 causes the ferrule sleeve 135 to be translated in a direction toward the second stop 138b until the end of the ferrule sleeve 135 contacts the second stop 138b. Contact of the end of the ferrule sleeve 135 with the second stop 138b allows the first ferrule 152b to be slid into the ferrule sleeve 135 as shown in FIG. 4. In some embodiments, the insertion of the first ferrule 152b into the split ferrule sleeve 135 causes the ferrule sleeve 135 to open, thereby increasing the diameter of the ferrule sleeve 135.

The first connector assembly 152 and its first ferrule 152b may be fully inserted into the connector sleeve assembly until the at least one first latch 133a deflects on the ramps of the at least one first latch 133a and clears the at least one first latch point 153a, thereby locking the connector sleeve assembly 136 to the first connector assembly 152. In the illustrated embodiment, the at least one first ferrule stop 153b of the first connector body 152a contacts the first stop 138a of the sleeve portion 134 of the sleeve housing 133, thereby preventing further forward motion of the first connector assembly 152 with respect to the connector sleeve assembly 136.

When the first connector assembly 152 is fully seated within the connector sleeve assembly 136, there may be a gap $G_{R1}$ between the first ferrule holder 154 and the first ferrule stop 153b. Thus, the first bias member 152c does not force the first ferrule holder 154 into contact with the first ferrule stop 153b, and provides a nominal retraction of the first ferrule holder 154 with respect to the first ferrule stop 153b by a distance equal to gap $G_{R1}$. In the illustrated embodiment, a gap $G_{L1}$ is present between an engagement surface of the at least one first latch 133a and the at least one first latch point 153a. The gap $G_{L1}$ allows axial movement of the first connector assembly 152 within the connector sleeve assembly 136. It should be understood that, in other embodiments, no gap $G_{L1}$ is present between the at least one first latch 133a and the at least one first latch point 153a.

The construction of the first connector assembly 152 and the connector sleeve assembly 136 provide a gap $G_{S1}$ between the first stop 138a and the first end of the ferrule sleeve 135 when the first connector assembly 152 is fully seated within the connector sleeve assembly 136. As described in more detail below, the gap $G_{S1}$ is configured to be large enough such that the first end of the ferrule sleeve 135 does not contact the first stop 138a when a complimentary second connector assembly 252 is fully positioned within the connector sleeve assembly 136.

Figure 5:
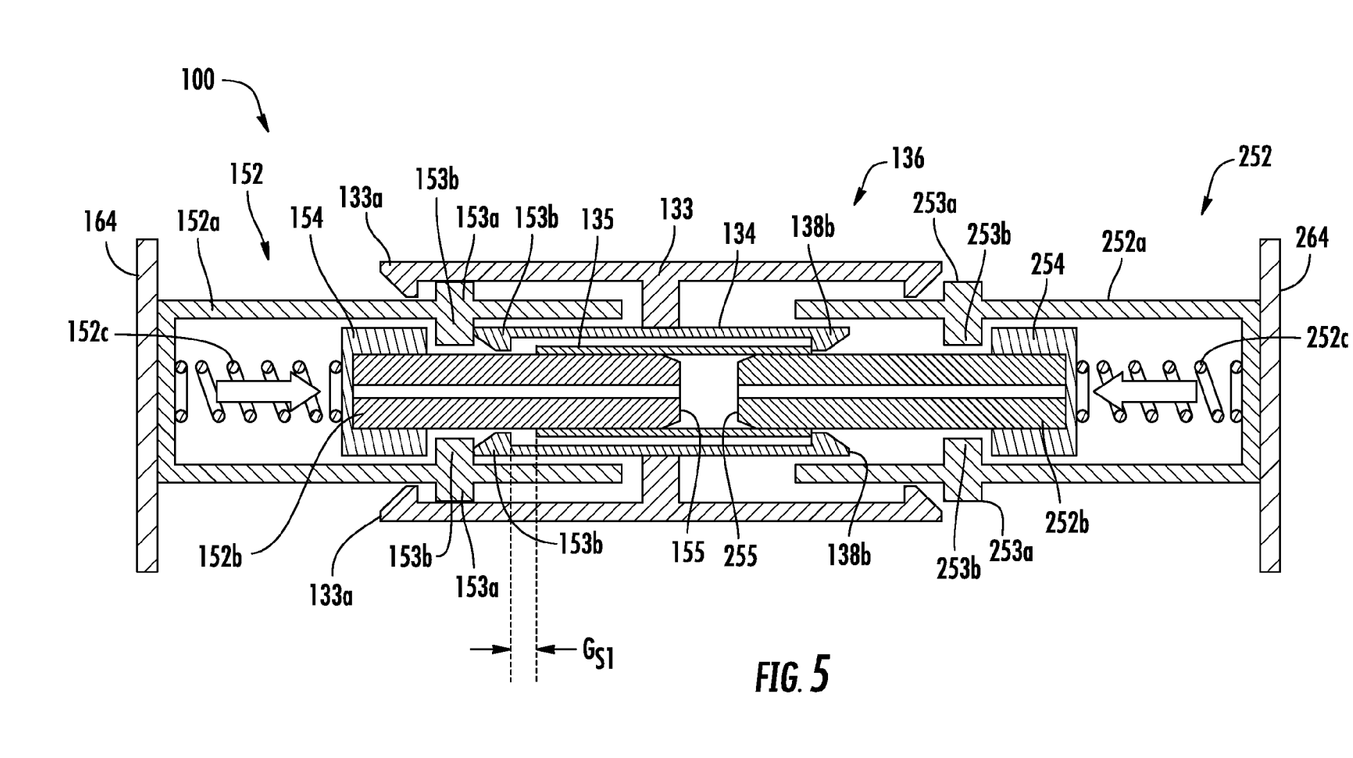
FIG. 5 is a schematic force-loading diagram for the fiber optic connector depicted in FIG. 4 with a complementary second fiber optic connector assembly partially inserted into a ferrule sleeve according to the concepts disclosed herein.

To prevent movement of the ferrule sleeve 135 and the first ferrule 152b disposed therein from translating in a direction back toward the first stop during insertion of a second ferrule 252b into the ferrule sleeve 135. Referring now to FIG. 5, a second connector assembly 252 is schematically illustrated as being partially inserted into the connector sleeve assembly 136. The second connector assembly 252 may be a complimentary connector to the first connector assembly 152. As such the second connector assembly 252 comprises a second connector body 252a, a second ferrule holder 254, and a second ferrule 252b coupled to the second ferrule holder 254. The second connector assembly 252 further includes a second bias member 252c that biases the second ferrule holder 254 and the second ferrule 252b in a forward direction. The second bias member 252c may be a spring, for example. The example second connector body 252a includes at least one second latch point 253a operable to engage the at least one second latch 133b of the sleeve housing 133. The example second connector body 252a further includes at least one second ferrule stop 253b extending into an interior of the second connector body 252a toward the second ferrule 252b. The at least one second ferrule stop 253b provides a stop for the second ferrule holder 254, thereby preventing too much forward movement of the second ferrule 252b into the connector sleeve assembly 136.

It is noted that, in some embodiments, the sleeve housing 133 does not include second latches 133b for engaging with the second connector body 252a. For example, when the fiber optic connector 100 is configured as a ruggedized female optical connector and the first connector assembly 152 is disposed in a female coupling housing 164, no second latches 133b may be provided to promote easy demating of the second connector assembly 152 from the fiber optic connector 100.

As shown in FIG. 5, the second ferrule 252b is partially inserted into the ferrule sleeve 135 without significantly reducing the gap $G_{S1}$ as it was prior to insertion of the second ferrule 252b. To eliminate or minimize translation of the ferrule sleeve 135 during insertion of the second ferrule 252b, the friction between the second ferrule 252b and the inner surface of the ferrule sleeve 135 may be reduced. Further the initial force of the second ferrule 252b onto the ferrule sleeve 135 may also be reduced to eliminate or minimize translation of the ferrule sleeve 135 during insertion of the second ferrule 252b. This may be accomplished in a variety of ways.

In some embodiments, a lubricant or other coating or material may be provided between the surface of the second ferrule 252b and an inner surface of the ferrule sleeve 136. A typical material for a ferrule is Zirconia, which has a coefficient of friction of about 0.4. The coefficient of friction of the lubricant or other coating/material is less than that of the second ferrule 252b such that the movement of the ferrule sleeve 136 during insertion of the second ferrule 252b is minimized. As an example and not a limitation, the coefficient of friction of the lubricant or other coating/material is less than or equal to 0.2. In some embodiments, the lubricant may be optically index matching to the optical fibers (not shown) within the first ferrule 152b and the second ferrule 252b such that it does not contribute to optical loss. Additionally, the lubricant may be prevented from reaching the end face of the first ferrule 152b and the second ferrule 252b.

In addition to, or in lieu of, utilizing a lubricant or other coating/material on the second ferrule 252b, the split ferrule sleeve 136 may be temporality opened during insertion of the second ferrule 252b into the ferrule sleeve 135. As the frictional force of the ferrule sleeve 135 to the second ferrule 252b is determined by the normal force from the radial interference, temporarily reducing the normal force may reduce the frictional force to potentially equal to or under 2 N, or equal to or under 1 N. The normal force may then be restored upon full mating between the first connector assembly 152 and the second connector assembly 252 to ensure proper alignment of the first ferrule 152b and the second ferrule 252b (i.e., the ferrule sleeve 135 may be closed after mating). The split ferrule sleeve 136 may be opened during second ferrule 252b insertion in a variety of ways. In one non-limiting example, the split ferrule sleeve 135 may be mechanically opened, such as by the use of a tool, or a mechanical feature of the connector sleeve assembly 136 (e.g., a lever). The tool or mechanical feature may be disposed within the slit 139 of the ferrule sleeve 135 to temporally pry open the ferrule sleeve 135. In another non-limiting example, the ferrule sleeve 135 may be opened by temporarily heating the ferrule sleeve 135 to open it by thermal expansion. When the second ferrule 252b is fully inserted into the ferrule sleeve 135 and the ferrule sleeve 135 is cooled, the ferrule sleeve 135 will close more tightly around the second ferrule 252b, thereby allowing the first ferrule 152b, the second ferrule 252b and the ferrule sleeve 135 to move as one unit within the sleeve housing 133.

As another example that may be used alone or in combination with the examples above, a diameter of the first ferrule 152b may be larger than a diameter of the second ferrule 252b. Insertion of the first ferrule 152b into the ferrule sleeve 135 first may cause the ferrule sleeve 135 to open, which will generate less interference of the ferrule sleeve 135 on the smaller diameter second ferrule 252b. In one non-limiting example, the diameter of the first ferrule 152b is at an upper end of a tolerance range, while the diameter of the second ferrule 252b is at a lower end of the tolerance range.

It is noted that, with a traditional 2.5 mm ferrule-and-sleeve design, the alignment of the connector is sensitive to as little as two degree axial misalignment of the second ferrule to produce a force "bump" upon engaging with the ferrule sleeve to displace the ferrule sleeve. Thus, geometric control of the misalignment to about one degree or better may reduce the associated force. When the force "bump" is kept below the frictional force keeping the ferrule sleeve 135 on the first ferrule 152b, the movement of the first ferrule 152b and the ferrule sleeve 135 is eliminated or reduced when the second ferrule 252b is inserted into the ferrule sleeve 135.

Figure 6:
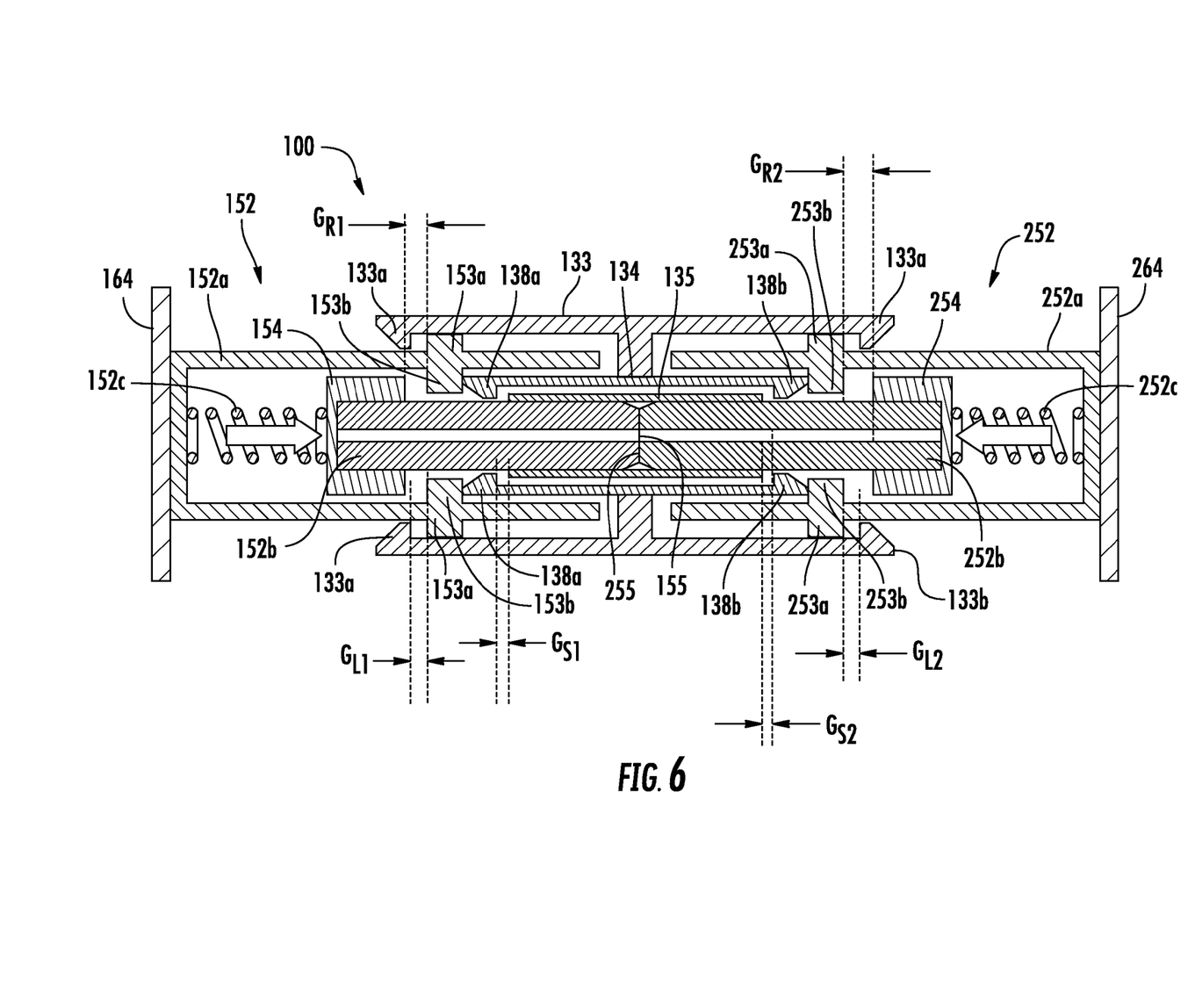
FIG. 6 is a schematic force-loading diagram for the fiber optic connector depicted in FIGS. 4 and 5 with the complementary second fiber optic connector assembly fully mated to the fiber optic connector according to the concepts disclosed herein.

Referring now to FIG. 6, the second connector assembly 252 is fully inserted into the connector sleeve assembly 136 such that the first connector assembly 152 is mated to the second connector assembly 252. As an end face 255 of the second ferrule 252b contacts an end face 155 of the first ferrule 152b and the second connector assembly 252 is pushed toward the first connector assembly 152, the first ferrule 152b and the ferrule sleeve 135 are pushed back in a direction toward the first stop 138a of the sleeve holder portion 134 of the sleeve housing 133. This causes the gap $G_{S1}$ between the first end of the ferrule sleeve 135 and the first stop 138a to be reduced as compared to the gap prior to insertion of the second ferrule 252b into the ferrule sleeve 135. However, the first end of the ferrule sleeve 135 does not contact the first stop 138a. Additionally, the gap $G_{R1}$ is increased by the retraction of the first ferrule 152b and the first ferrule holder 154, which causes compression of the first bias member 152c.

A gap $G_{S2}$ is also present between the second end of the ferrule sleeve 135 and the second stop 138b. Thus, the second end of the ferrule sleeve 135 does not contact the second stop 138b. A gap $G_{R2}$ is also present between the second ferrule holder 254 and the second ferrule stop 253b, which causes the second bias member 252c to be compressed between the second ferrule holder 254 and the second connector body 264.

Because the first and second ends of the ferrule sleeve 135 do not contact the first and second stops 138a, 138b of the ferrule holder portion 134, the spring forces of the first and second bias members 152c, 252c are "balanced." In other words, the first bias member 152c and the second bias member 252c are permitted to react to one another without the additional force vectors cause by contact of the ends of the ferrule sleeve 135 with the first stop 138a or the second stop 138b. By removing the frictional forces of the ferrule sleeve 135 from the equation, the mating of the first connector assembly 100 and mating second connector assembly 252 act as a normal system with the balancing of the first bias member 152c and second bias member 252c for axially loading the respective first ferrule 152b and second ferrule 252b with physical contact and preserving optical performance. It is noted that gap $G_{R1}$ may be equal to or not equal to gap $G_{R2}$.

The concepts of a ferrule-based fiber optic connector having a ferrule retraction balancing characteristic for inhibiting ferrule displacement may be embodied in many different fiber optic connector configurations. The following fiber optic connector using the concepts disclosed is for explanatory purposes and is suited for mating directly with an OptiTap plug connector similar that shown in FIGS. 1A-1C. By way of description, the fiber optic connector 100 depicted in FIG. 7 is a non-limiting example of an in-line female hardened connector according to the concepts disclosed herein. Of course, other fiber optic connectors are possible using the concepts of the claims such as being used with other types of hardened connectors. Generally, the reference numbers provided in FIG. 7 correspond to the reference number of the components depicted in FIGS. 4-6.

The fiber optic connector comprises a first connector assembly 152, a body having at least one shell 155a (as shown two shells 155a that form the body), a connector sleeve assembly 136, a female coupling housing 164, and a fiber optic cable 140 disposed within the female coupling housing 164. As described above, the connector sleeve assembly 136 comprises a sleeve body 133 and a split ferrule sleeve 135. The sleeve body 133 further comprises a sleeve holder portion 134 that loosely receives the ferrule sleeve 135, and two latches 133a.

The first connector assembly 152 generally comprises a first connector body 152a having two first latch points 153a operable to engage the two first latches 133a of the sleeve body 133. A first ferrule 152b, a first ferrule holder 154 (not shown), and a first bias member 152c (not shown) are disposed within the first connector body 152. The first ferrule 152b is disposed within the ferrule sleeve 135 within the sleeve holder portion 134 of the sleeve housing 133. The example first connector assembly 152 is depicted as an industry standard SC type connector assembly. However, any of the embodiments described herein may use any suitable connector assembly, such as a SC or a LC connector assembly having a ferrule and a connector housing along with other suitable components.

An optical fiber 141 of the fiber optic cable 140 is disposed within the first connector body 152b and the first ferrule 152b. The two shells 155a cooperate to partially surround the first connector body 152b as well as to retain the fiber optic cable 140 to the first connector body 152a. In some embodiments, a crimp band (not shown) may be utilized around the shells 155a of the body to secure the fiber optic cable 140 to first connector body 152a. The crimp band may also be used for securing the tensile elements (not shown) of fiber optic cable 140. For instance, the tensile elements may be a plurality of tensile yarns attached between an outer barrel of the body and the crimp band. In other embodiments, one or more strength components such as GRP rods maybe secured to the cable attachment region of the fiber optic connector such as between the shells 155a. An optional second crimp band (not shown) may be used for cables or constructions where it is desired to strain-relieve the fiber optic cable 140 directly to the first connector assembly 152. By way of example, tensile elements such as aramid yarns may be secured to the first connector assembly 152 using the second crimp band for providing strain-relief. Fiber optic connectors may also include a dust cap (not shown), but other suitable configurations are possible using fewer or more components.

Generally speaking, most of the components of fiber optic connector 100 are formed from a suitable polymer, but other materials such as metal are possible. In one example, the polymer is a UV stabilized polymer such as ULTEM 2210 available from GE Plastics if the component is exposed to the elements; however, other suitable polymer materials are possible. For instance, stainless steel or any other suitable metal may be used for various components as desired.

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:
1. A fiber optic connector comprising:
a connector assembly comprising:
a ferrule;
a resilient member for biasing the ferrule forward; and
a connector body comprising at least one latch point and at least one ferrule stop, wherein the ferrule and the resilient member are disposed within the connector body;
a connector sleeve assembly comprising:
a sleeve housing comprising at least one latch, a first stop at a first end, a second stop at a second end, and a passageway between the first end and the second end; and
a ferrule sleeve, wherein the connector assembly is at least partially disposed in the passageway of the sleeve housing, and the ferrule of the connector assembly is at least partially disposed in the ferrule sleeve in a direction extending from the first stop, and wherein when the fiber optic connector is in an unmated state:
a gap $G_{L1}$ is present between the at least one latch and the at least one latch point; and
a gap $G_{S1}$ is present between the first stop of the sleeve housing and a first end of the ferrule sleeve.

2. The fiber optic connector of claim 1, wherein:
the connector assembly further comprises a ferrule holder;
the ferrule is coupled to the ferrule holder; and
a gap $G_{R1}$ is present between the ferrule holder and the at least one ferrule stop when the fiber optic connector is in an unmated state.

3. The fiber optic connector of claim 1, wherein the first end of the sleeve housing contacts the at least one ferrule stop when the fiber optic connector is in an unmated state.

4. The fiber optic connector of claim 1, wherein the sleeve contacts the second stop of the sleeve housing when the fiber optic connector is in an unmated state.

5. The fiber optic connector of claim 1, wherein when the fiber optic connector is in a mated state with a complimentary fiber optic connector:
the first end of the ferrule sleeve does not contact the first stop of the sleeve housing such that the gap $G_{S1}$ when the fiber optic connector is in the mated state is less than the gap $G_{S1}$ when the fiber optic connector is in the unmated state; and
the second end of the ferrule sleeve does not contact the second stop of the sleeve housing.

6. The fiber optic connector of claim 5, wherein the gap $G_{R1}$ when the fiber optic connector is in the mated state is greater than the gap $G_{R1}$ when the fiber optic connector is in the unmated state.

7. The fiber optic connector of claim 5, wherein a diameter of the ferrule is greater than a diameter of a complimentary ferrule of the complimentary fiber optic connector.

8. The fiber optic connector of claim 1, further comprising a female coupling housing comprising an opening for receiving a complimentary connector.

9. The fiber optic connector of claim 1, further comprising a housing, and wherein the connector assembly is an SC connector assembly.

10. The fiber optic connector of claim 1, further including a crimp band.

11. The fiber optic connector of claim 1, wherein the fiber optic connector is a portion of a cable assembly further including a fiber optic cable attached to the fiber optic connector.

12. The fiber optic connector of claim 11, wherein the fiber optic cable includes strength members secured to a cable attachment region.

13. The fiber optic connector of claim 11, wherein the fiber optic connector further comprises a first shell and a second shell that are secured using a crimp band and/or an adhesive.

14. The fiber optic connector of claim 11, wherein the cable assembly further includes a boot.

15. A fiber optic connection comprising:
a first connector assembly comprising:
a first ferrule;
a first resilient member for biasing the first ferrule forward; and
a first connector body comprising at least one first latch point and at least one ferrule stop, wherein the first ferrule and the first resilient member are disposed within the first connector body;
a second connector assembly comprising a second ferrule and a second resilient member for biasing the second ferrule forward, wherein a diameter of the first ferrule is greater than a diameter of the second ferrule;
a connector sleeve assembly comprising:
a sleeve housing comprising at least one latch, a first stop at a first end, a second stop at a second end, and a passageway between the first end and the second end; and
a ferrule sleeve, wherein the first connector assembly is at least partially disposed in the passageway of the sleeve housing, and the first ferrule of the first connector assembly is at least partially disposed in the ferrule sleeve in a direction extending from the first end, wherein:
when the fiber optic connector assembly is in an unmated state:
a gap $G_{L1}$ is present between the at least one latch and the at least one first latch point; and
a gap $G_{S1}$ is present between the first stop of the sleeve housing and a first end of the ferrule sleeve, and
when the fiber optic connector assembly is in a mated state such that the first connector assembly is mated to the second connector assembly within the sleeve housing:
the second ferrule of the second connector assembly is disposed within the ferrule sleeve;
the first end of the ferrule sleeve does not contact the first stop of the sleeve housing such that the gap $G_{S1}$ when the fiber optic connector assembly is in the mated state is less than the gap $G_{S1}$ when the fiber optic connector assembly is in the unmated state; and
the second end of the ferrule sleeve does not contact the second stop of the sleeve housing.

16. The fiber optic connection of claim 15, wherein:
the first connector assembly further comprises a first ferrule holder
the first ferrule is coupled to the first ferrule holder; and
a gap $G_{R1}$ is present between the first ferrule holder and the at least one ferrule stop.

17. The fiber optic connection of claim 15, wherein the first end of the sleeve housing contacts the at least one first ferrule stop when the fiber optic connector assembly is in an unmated state.

18. The fiber optic connection of claim 15, wherein the second connector assembly comprises a second connector body comprising at least one second latch point and at least one second ferrule stop, wherein the second ferrule and the second resilient member are disposed within the second connector body.

19. The fiber optic connection of claim 15, wherein when the fiber optic connector assembly is in the mated state:
the first end of the sleeve housing contacts the at least one first ferrule stop; and
the second end of the sleeve housing contacts the at least one second ferrule stop.

20. The fiber optic connection of claim 15, wherein the gap $G_{R1}$ when the fiber optic connector assembly is in the mated state is greater than the gap $G_{R1}$ when the fiber optic connector assembly is in the unmated state.

21. The fiber optic connection of claim 15, wherein a coefficient of friction of the second ferrule is less than 0.4.

22. The fiber optic connection of claim 15, wherein a coefficient of friction of the second ferrule is less than or equal to 0.2.

23. The fiber optic connection of claim 15, wherein a lubricant is disposed on a surface of the second ferrule.

24. The fiber optic connection of claim 15, further comprising a female coupling housing comprising an opening for receiving the second connector assembly.

25. The fiber optic connection of claim 15 wherein each of the first connector assembly and the second connector assembly is an SC connector assembly.

26. The fiber optic connection of claim 15, wherein at least one of the first connector assembly and the second connector assembly further comprises a crimp band.

27. The fiber optic connection of claim 15, wherein at least one of the first connector assembly and the second connector assembly is a portion of a cable assembly further including a fiber optic cable.

28. The fiber optic connection of claim 27, wherein the fiber optic cable includes strength members secured to a cable attachment region.

29. The fiber optic connection of claim 27, wherein at least one of the first connector assembly and the second connector assembly further comprises a first shell and a second shell that are secured using a crimp band and/or an adhesive.

30. The fiber optic connection of claim 29, wherein the cable assembly further includes a boot.

31. A method of assembling a fiber optic connector assembly, the method comprising:
  coupling a first connector assembly to a connector sleeve assembly, wherein:
    the first connector assembly comprises:
      a ferrule;
      a resilient member for biasing the ferrule forward; and
      a connector body comprising at least one latch point, wherein the ferrule and the resilient member are disposed within the connector body;
    the connector sleeve assembly comprises:
      a sleeve housing comprising at least one latch, a first stop at a first end, a second stop at a second end, and a passageway between the first end and the second end; and
      a ferrule sleeve, wherein the first connector assembly is at least partially disposed in the passageway of the sleeve housing, and the ferrule of the first connector assembly is at least partially disposed in the ferrule sleeve in a direction extending from the first stop, and
    the first connector assembly is coupled to the connector sleeve assembly such that:
      a gap $G_{L1}$ is present between the at least one latch and the at least one latch point; and
      a gap $G_{S1}$ is present between the first stop of the sleeve housing and a first end of the ferrule sleeve.

32. The method of claim 31, further comprising coupling a second connector assembly to the connector sleeve assembly, wherein:
  the second connector assembly comprises a second ferrule and a second resilient member for biasing the second ferrule forward;
  the second ferrule is disposed within the ferrule sleeve in a direction extending from the second stop;
  the second ferrule of the second connector assembly is disposed within the ferrule sleeve;
  the first end of the ferrule sleeve does not contact the first stop of the sleeve housing such that the gap $G_{S1}$ when the fiber optic connector assembly is in the mated state is less than the gap $G_{S1}$ when the fiber optic connector assembly is in the unmated state; and
  the second end of the ferrule sleeve does not contact the second stop of the sleeve housing.

33. The method of claim 32, wherein a diameter of the ferrule is greater than a diameter of the second ferrule.

34. The method of claim 32, further comprising applying a lubricant to a surface of the second ferrule prior to disposing the second ferrule in the ferrule sleeve.

35. The method of claim 32, wherein:
the ferrule sleeve is a split sleeve; and
the method further comprises:
  prior to coupling the first connector assembly and the second connector assembly to the connector sleeve assembly, opening the ferrule sleeve to increase a diameter of the ferrule sleeve; and
  after coupling the first connector assembly and the second connector assembly to the connector sleeve assembly, closing the ferrule sleeve to decrease the diameter of the ferrule sleeve.

* * * * *